Feb. 23, 1943.   H. S. BROADWATER   2,312,071
MOTOR VEHICLE
Filed March 7, 1940   3 Sheets-Sheet 3
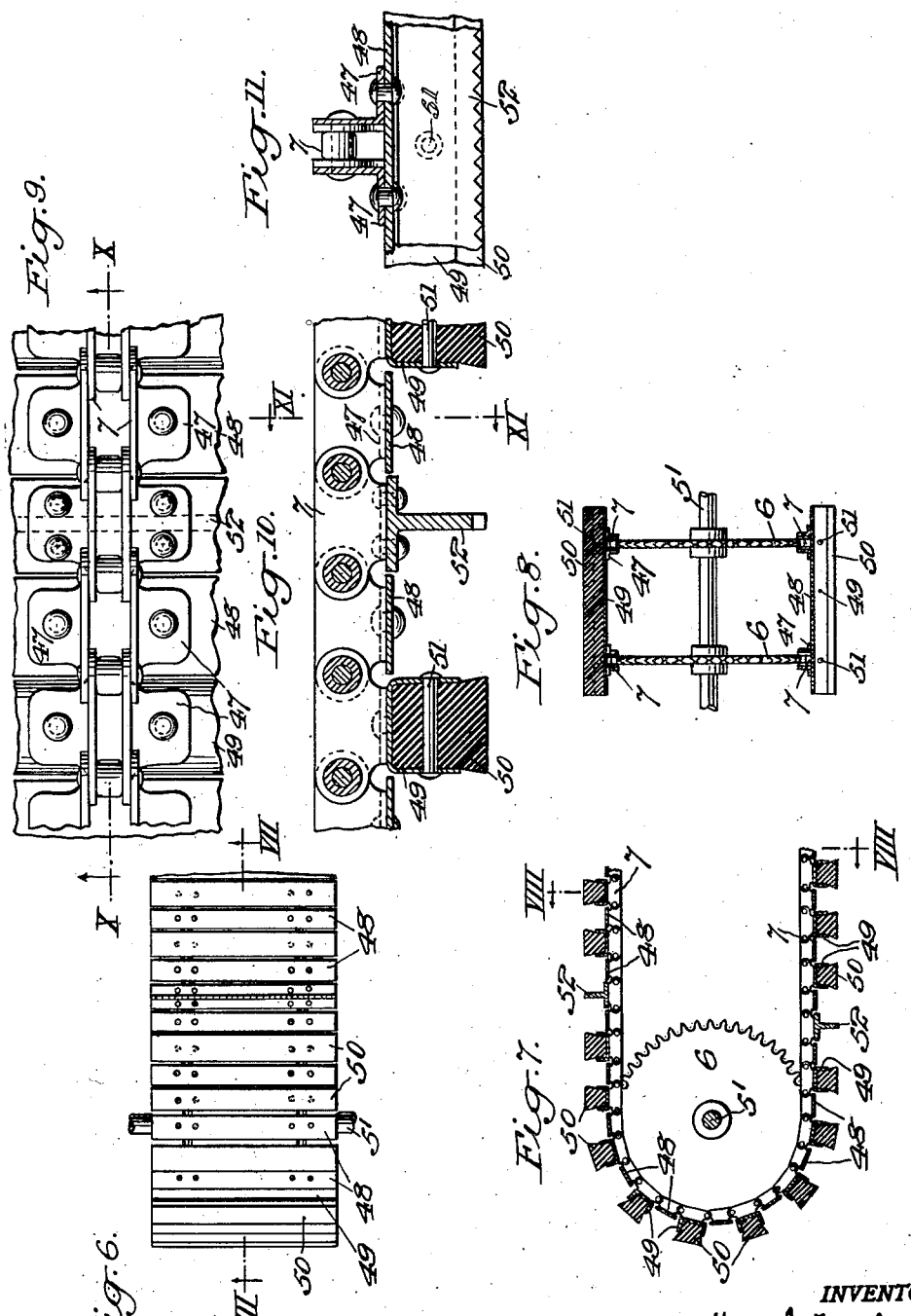
INVENTOR
Henry S. Broadwater
BY
Brown & Seward
ATTORNEYS Patented Feb. 23, 1943

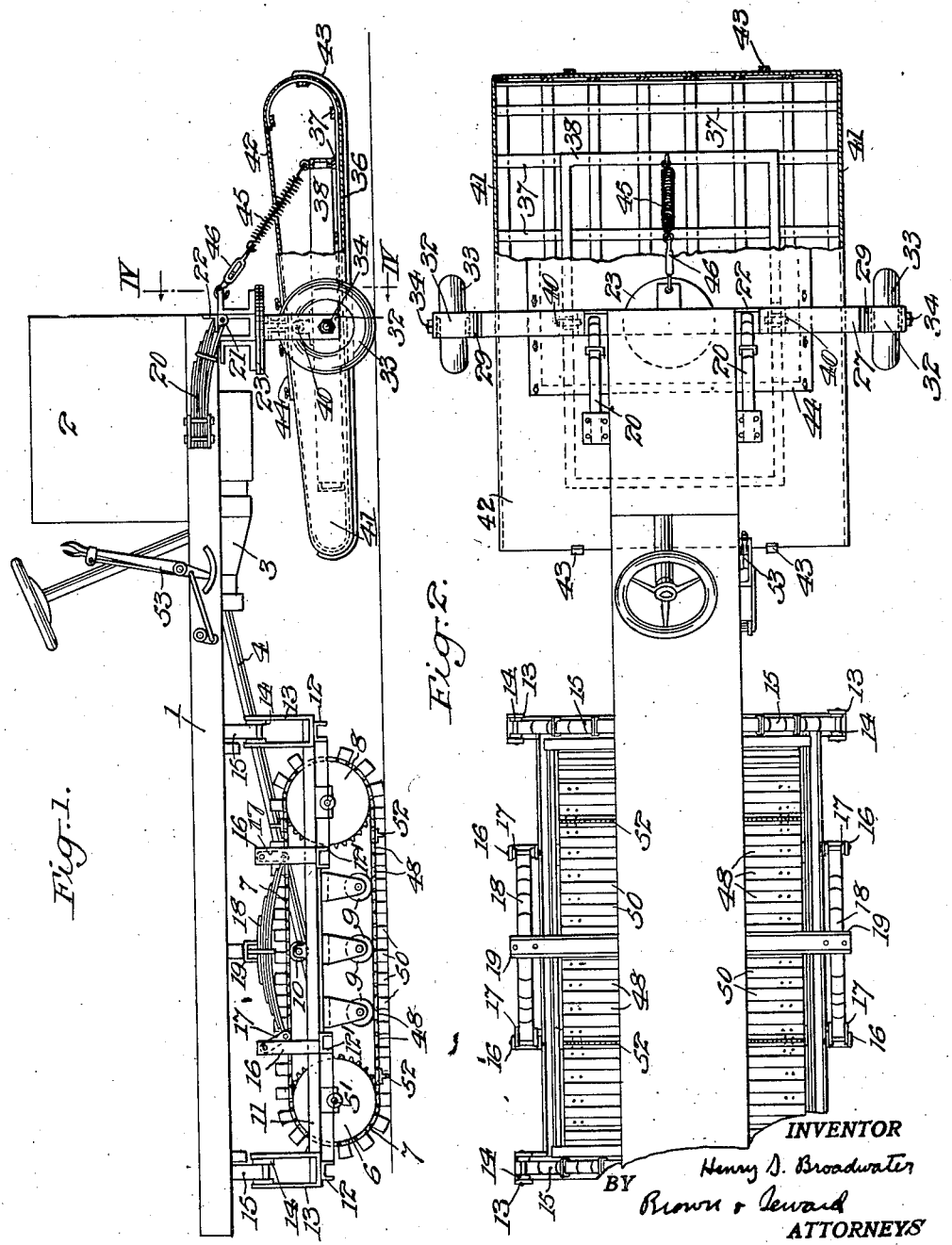

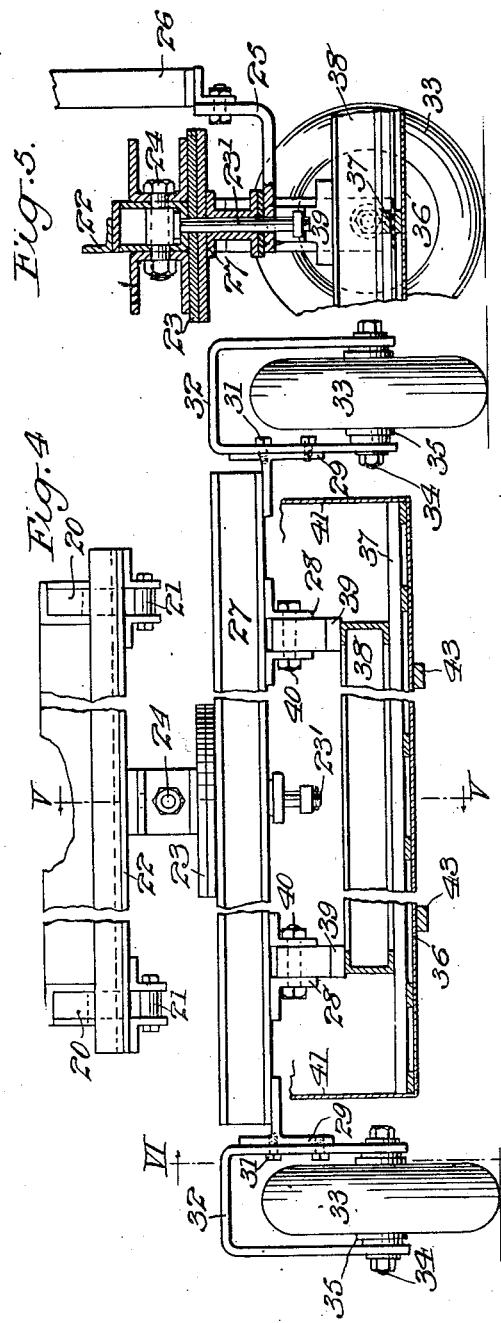

2,312,071

UNITED STATES PATENT OFFICE 2,312,071

MOTOR VEHICLE

Henry S. Broadwater, Ridgefield, Conn.; Victoria Tenger, executrix of Henry S. Broadwater, deceased, assignor to Victoria Tenger, Ridgefield, Conn.

Application March 7, 1940, Serial No. 322,663

5 Claims. (Cl. 180—5)

This invention relates to a motor vehicle, and particularly such a vehicle which is equipped with supporting and driving surfaces of large area adapting it to be operated over snow of any degree of softness as well as on icy or clear roads.

An object of the invention is to provide a vehicle in which a supporting surface compresses the snow and prepares it for engagement by a driving surface.

A further object is to provide such a vehicle in which the supporting surface will compress all types of snow to a substantially uniform condition.

Another object is to provide a driving means for the vehicle which will ensure perfect traction on all types of snow surface.

Another object is to provide driving means which will not become clogged with snow.

A still further object is to provide a driving means which can readily be adapted for use on various conventional types of motor vehicles in order to convert such vehicles for efficient operation over snow.

Another object of the invention is to provide certain improvements in the form, construction, arrangement and materials of the several parts whereby the above named and other objects may effectively be attained.

Many efforts have been made to solve the problems connected with motorized transportation over snow covered surfaces, but the solution of these problems has been difficult because of the extremely varying characteristics of snow. It is probable that some of the vehicles previously known can be made to give reasonably satisfactory service on relatively firm or hard-packed surfaces, but such vehicles become useless when they encounter areas of soft and fluffy snow, while any device designed for use in the latter situation would ordinarily not be adapted to travel over hard snow or ice. In the latter case the use of large supporting surfaces having a weight-area ratio comparable to that of a man on skis (approximately 55 lbs. per sq. ft.) may permit coasting on soft snow, but does not provide any means for securing adequate traction to enable the vehicle to be driven up hills or on a level. In the present invention a sliding supporting surface is provided of such size and position that it packs down soft snow or rides over hard snow leaving a path which the driving supporting surface will always engage firmly to propel the vehicle.

A practical embodiment of the invention is represented in the accompanying drawings, in which Fig. 1 represents a side elevation of the vehicle with its ground wheels in position for travel over a hard surface, parts being broken away;

Fig. 2 represents a top view of the vehicle as shown in Fig. 1;

Fig. 3 represents a rear end elevation on an enlarged scale;

Fig. 4 represents a transverse vertical section taken on the line IV—IV of Fig. 1 looking in the direction of the arrows, parts being broken away;

Fig. 5 represents a longitudinal detail vertical section taken along the line V—V of Fig. 4 looking in the direction of the arrows;

Fig. 6 represents a plan view of part of the driving track;

Fig. 7 represents a vertical section taken along the line VII—VII of Fig. 6;

Fig. 8 represents a transverse vertical section taken along the line VIII—VIII of Fig. 7;

Fig. 9 represents a detail plan view of a part of the driving track chain with tread elements secured thereto;

Fig. 10 represents a vertical section taken along the line X—X of Fig. 9, and

Fig. 11 represents a transverse vertical section taken along the line XI—XI of Fig. 10.

Referring to the drawings, it will be seen that the vehicle comprises a frame 1 on which is mounted a motor 2 which may be an automobile engine having suitable weight and horse-power characteristics and being adapted to drive through a transmission mechanism 3 the drive shaft 4. The motor will normally be provided with the usual control devices (including throttle, clutch, gear shift, etc.) which are not shown, and the drive shaft may be either enclosed in a torque tube or left exposed, as desired. The drive shaft 4 transmits its power through a differential mechanism 5 (Fig. 3) which may also be of automobile type, to driving axles 5' connected with sprocket wheels 6 which engage chains 7 of the endless belt driving elements. The chains 7 pass around idle sprocket wheels 8 and are supported by lower rollers 9 and upper rollers 10. The sprocket wheels 6 and 8 and the rollers 9 and 10 are mounted on the side members 11 of a bogie frame having transverse members 12, 12'. The front and back transverse members 12 carry U-shaped upright members 13 in which are secured spring shackles 14 connected to the ends of transverse leaf springs 15, and the springs are secured to and support the frame 1 of the vehicle, as clearly shown in Fig. 3.

To ensure additional lateral stability, other upwardly projecting U-shaped elements 16 may be mounted on intermediate transverse members 12' of the bogie to carry spring shackles 17 connected to longitudinal springs 18 which are secured to a transverse channel 19 extending under and supporting the vehicle frame 1. In some cases it may be found that sufficient stability can be secured while omitting one or both of the transverse springs 15, or both of the longitudinal springs 18.

Suspension of the forward end of the frame 1 is effected by means of springs 20 secured to sides of the frame and having their free ends pivotally connected by shackle bolts 21 to a floating cross piece 22 which carries a fifth wheel assembly 23 including an elongated king bolt 23'. Lateral flexibility is secured by the provision of a pivot bolt 24, while the brace 25 is secured to a part of the engine mounting 26 in order to improve the longitudinal stability.

The forward running gear includes a transverse beam or axle 27 secured to the fifth wheel assembly 23 and carrying downwardly projecting members 28 and 29. The members 28 constitute supports for the forward ski or float and the members 29 are adapted to receive the bolts 31, which bolts also pass through one side of the U-shaped wheel mountings 32 in order to secure them rigidly to the members 29. Ground wheels 33, which are preferably rubber tired, are supported on axle bolts 34 in the mountings 32, and may be removed for repairs by taking out the axle bolts or may be removed entirely by taking out the bolts 31. The wheels will normally be provided also with suitable anti-friction bearings 35 between the hub and the axle bolt.

The forward ski comprises a wide toboggan or float-shaped surface 36 on which are mounted a plurality of transverse members 37 which in turn carry a strong rectangular frame 38. The side members of the frame 38 are secured to upwardly projecting bearing blocks 39 which are pivotally connected by means of bolts 40 to the downwardly projecting members 28. It is desirable to equalize as far as possible the distribution of weight on the ski surface, and this is accomplished by location of the transverse members 37 at intervals along the middle fore-and-aft section of the ski, as shown in Fig. 2, while the support is further equalized by locating the bearing blocks 39 substantially at the middle of the side members of the frame 38.

The forward ski partakes of the characteristics of a float or pontoon by reason of the provision of straight side walls 41 and a top deck 42, which completely enclose it and eliminate the danger of picking up quantities of snow as in the case of open skis or toboggans. The side walls 41 provide lateral resistance for steering the vehicle, and rubber strips 43 may be mounted along the bottom and ends of the ski for the same purpose as well as to protect the ski against bumping on hard surfaces. An opening is formed in the middle of the top deck 42 to permit access to the interior and this opening may be closed by a removable hatch cover or covers 44 shaped to fit around the various supporting devices 28, 39 and 40. The ski has its front and back ends rounded so that it will readily ride over the snow in either direction, the curve in back being sharper than the curve in front since the vehicle will normally be backed only over snow which has been more or less compressed and since this arrangement provides a sloping top surface from which snow may readily be removed.

The front end of the forward ski is additionally supported by means of a spring 45, the tension of which may be adjusted by means of a turnbuckle 46; this adjustment being desirable in order that the ski may be held substantially horizontal when the vehicle is traveling over hard surfaces on its wheels 33 (as shown in Fig. 1), while the tension is increased to raise the front end of the ski with a planing effect when the vehicle is driven over snow. In the latter case the angle of inclination may desirably be approximately 20° from the horizontal, although the resilience of the spring will permit variations in accordance with such surface irregularities as may be encountered.

The forward running gear may be turned around the king bolt 23' by steering rods and knuckles, not shown, connected with the steering wheel in a conventional or readily understood manner.

The endless belt driving elements constitute an important feature of this invention and will be described in detail, having reference particularly to Figs. 6 to 11 inclusive. These driving elements comprise preferably a pair of chains 7 which may conveniently be standard conveyor chains of the roller type with integrally formed attaching plates 47. For the best results over various types of surfaces it is desirable to use a combination of different tread members, and the arrangement shown herein has proved to be particularly effective. Alternating tread members are formed simply of flat aluminum plates 48 bolted or riveted to the attaching plates 47; and other tread members comprise channels 49, also bolted or riveted to the attaching plates 47, which channels form a support for rubber tread blocks 50, the latter being retained within the channels by bolts or rivets 51. The rubber tread blocks are arranged to project a substantial distance beyond the channels, as shown in Figs. 7 and 10. While the alternation of rubber and aluminum tread members will give excellent results either on snow or on a clear road, it is desirable to provide also the T-shaped aluminum bars 52 (having saw-toothed or plain edges) at intervals which may be, for instance, every twenty links of the chain, to ensure adequate traction on any icy surfaces which may be encountered. The T-bars 52 are bolted or riveted to the supporting plates 47 as in the case of the plates 48 and channels 49.

It has been found that snow will not readily adhere to rubber or to aluminum, and the use of these materials to make up all or the greater part of the driving tread is of importance since it eliminates the possibility of the mechanism becoming clogged or caked with snow. The alternation of high and low tread members gives a castellated profile which ensures perfect traction on all kinds of snow surfaces; and any tendency of the snow to become caked on the belt between the rubber tread blocks is eliminated not only by the use of the non-clogging materials, rubber and aluminum, but also by the fact that the belt "breaks" as it passes around the sprocket wheels, thus releasing any cake of snow or ice which might have been picked up.

The hand brake lever 53 may be connected by mechanical or hydraulic linkage, not shown, to act on the brake drums 54 which are located near the outer ends of the driving axles 5'. If desired, a separate hand or foot brake may be provided for each of the brake drums in order to facilitate turning of the vehicle, particularly if the driving belts are more widely spaced as in cases where the device is used for conversion of conventional automobile or truck chassis.

It will be appreciated that the driving elements just described may be mounted for use on the rear axle of an automobile without substantial modification except to replace the automobile wheels with sprocket wheels, so that this arrangement is particularly convenient in cases where it is desired to convert an automobile for efficient operation on snow.

While the operation of the vehicle may be readily understood from the foregoing description, it may be added that a vehicle constructed as shown in Figs. 1 and 2 is designed to carry 2 or 3 passengers seated tandem, and a typical weight of the loaded vehicle is approximately 4000 lbs. This weight is distributed substantially equally between the front ski and the rear driving belt. The front ski shown has an area of approximately 20 sq. ft., corresponding to a pressure on the snow of 100 lbs. per sq. ft. The total area of the double track is 10 sq. ft. which corresponds to a pressure on hard snow of 200 lbs. per sq. ft. (This figure may be compared with the pressure of 300 lbs. per sq. ft. exerted by a 200 lb. man standing on both feet.) Considering the total weight of the vehicle (4000 lbs.) in relation to the total supporting surface of 30 sq. ft., the pressure amounts to 133 lbs. per sq. ft.

From the foregoing it will be understood that on hard-packed snow or a cleared road the total weight of the vehicle may be carried by the front ground wheels and the rear driving tracks. On shallow soft snow (not more than 2-ft. deep) the forward ski will become active and will raise the wheels from the ground, while the rear driving tracks press into the snow to a depth of about 1-ft. In deep soft snow (more than 2-ft. deep) the front ski will pack down a lane from 3 to 9 inches deep, on which the driving tracks secure perfect traction while compressing it only one to three inches further.

Referring again to operation of the device on ice or a cleared road, it will be observed that the proportion of metal bearing on the ground compared to the total rubber surface is very much less than the proportion of ordinary anti-skid chains on an automobile tire, so that a cleared road will not be damaged by the operation of the vehicle, while the bars 52 provide a much firmer grip on ice than is possible with ordinary chains.

Soft snow, especially when wet and not fluffy, adheres to most metal surfaces and all wood surfaces which are not waxed. To prevent such adherence the under part of the forward ski may be formed of aluminum, thus taking advantage of the fact previously noted that snow does not adhere to aluminum. Wherever the material "aluminum" is mentioned herein it will be understood that alloys thereof such as "duralumin" and the like are intended to be included.

It will be apparent that various changes may be made in the construction, form, arrangement and materials of the several parts without departing from the scope of my invention and hence I do not intend to be limited to the particular embodiment herein shown and described, but

What I claim is:

1. In a motor vehicle of the character described, a support for the front end of said vehicle comprising a forward ski element having substantially flat top and bottom surfaces spaced apart and connected at their front and back edges by curved surfaces and at their side edges by substantially flat walls, said surfaces extending on both sides of the central longitudinal plane of the vehicle, and said element being pivoted for rocking motion around a horizontal axis extending transversely of the vehicle, means for holding said element in a forwardly and upwardly inclined position, and means for turning said element about a vertical axis whereby said vehicle may be steered in desired directions.

2. In a motor vehicle of the character described, a support for the front end of said vehicle comprising a forward ski element having substantially flat non-parallel top and bottom surfaces spaced apart and connected at their front edges by a curved surface of relatively large radius, at their back edges by a curved surface of smaller radius, and at their side edges by substantially flat walls, thereby constituting an enclosed body tapering rearwardly in a vertical plane, said element being pivoted for rocking motion around a horizontal axis extending transversely of the vehicle at a point to the rear of the center of gravity of the element, and means for holding said element in a forwardly and upwardly inclined position.

3. A motor vehicle of the character described comprising, a plurality of vehicle-supporting means positioned at different heights, the lower of said means including a driving element having a substantial ground-engaging area adapted to support the vehicle on relatively compacted surfaces and to constitute the sole support for the rear of the vehicle, and the higher of said means constituting a ski element of extended surface area extending on both sides of the central longitudinal plane of the vehicle and to a distance from said plane at least equal to the distance of the outer edge of the driving element from the same plane, whereby said ski element is adapted to engage the snow and compact it for engagement by and support of the driving element.

4. A motor vehicle of the character described comprising, a forward ski element of extended surface area extending on both sides of the central longitudinal plane of the vehicle, said element being pivotally connected to the front axle of the vehicle and having a greater part of its area in front of said axle, adjustable means for holding said element in horizontal position for operation over hard surfaced roads and in a forwardly and upwardly inclined position for operation over soft snow, wheels mounted on said front axle at points spaced laterally outside of the area of the ski element and adapted to project below the bottom surface of the ski element for supporting the front of the vehicle on a hard surfaced road or the like, and a rear driving element having a substantial ground-engaging area positioned behind, and lower than, the ski element and adapted to operate wholly within the path made by said ski element and to constitute the sole support for the rear of the vehicle.

5. A motor vehicle of the character described comprising, a plurality of vehicle-supporting means positioned at different heights, the lower of said means including a driving element adapted to support the vehicle on relatively compacted surfaces, and the higher of said means constituting a ski element of extended surface area extending on both sides of the central longitudinal plane of the vehicle and to a distance from said plane at least equal to the distance of the outer edge of the driving element from the same plane, whereby said ski element is adapted to engage the snow and compact it for engagement by and support of the driving element, the areas of the vehicle supporting means being related to the weight of the vehicle so that the pressure of the driving element alone is less than 300 lbs. per sq. ft. and greater than 100 lbs. per sq. ft., and the pressure of the ski element is approximately 100 lbs. per sq. ft.

HENRY S. BROADWATER.